United States Patent [19]
McCauley

[11] 3,882,717
[45] May 13, 1975

[54] SELF-ADJUSTING ULTRASONIC TIRE INSPECTION DEVICE

[75] Inventor: Porter T. McCauley, Winnetka, Ill.

[73] Assignee: James Electronics Inc., Chicago, Ill.

[22] Filed: June 20, 1973

[21] Appl. No.: 371,601

[52] U.S. Cl. ............................................. 73/67.8 S
[51] Int. Cl. ......................................... G01n 29/04
[58] Field of Search ............... 73/67.8 S, 67.6, 67.2, 73/67.5 R, 69, 71.5 US, 146

[56] References Cited
UNITED STATES PATENTS

| | | | |
|---|---|---|---|
| 2,345,679 | 4/1944 | Linse | 73/67.6 |
| 2,378,237 | 6/1945 | Morris | 73/67.6 |
| 2,921,126 | 1/1960 | Street et al. | 73/67.6 |
| 3,074,267 | 1/1963 | Martin | 73/67.5 R |
| 3,336,794 | 8/1967 | Wysoczanski et al. | 73/67.5 R |
| 3,596,503 | 8/1971 | Gay et al. | 73/67.8 S |
| 3,604,249 | 9/1971 | Wilson | 73/67.2 |
| 3,608,360 | 9/1971 | Pettinato | 73/67.5 R |

FOREIGN PATENTS OR APPLICATIONS
665,153  1/1952  United Kingdom ............. 73/67.5 R Primary Examiner—Richard C. Queisser
Assistant Examiner—Stephen A. Kreitman

[57] ABSTRACT

An ultrasonic tire inspection device repeatedly scans successive longitudinal segment tracks across the width of a tire tread. On the first or initial scan of each track, the inspection device adjusts its bias to the average reading for that track. This way, the reading scan always begins with the same zero setting regardless of whether the tread is thick, thin, or some place in between. On the second or reading scan, the inspection device records any deviation below average, which is greater than a predetermined amount, thus indicating a tire defect.

14 Claims, 8 Drawing Figures

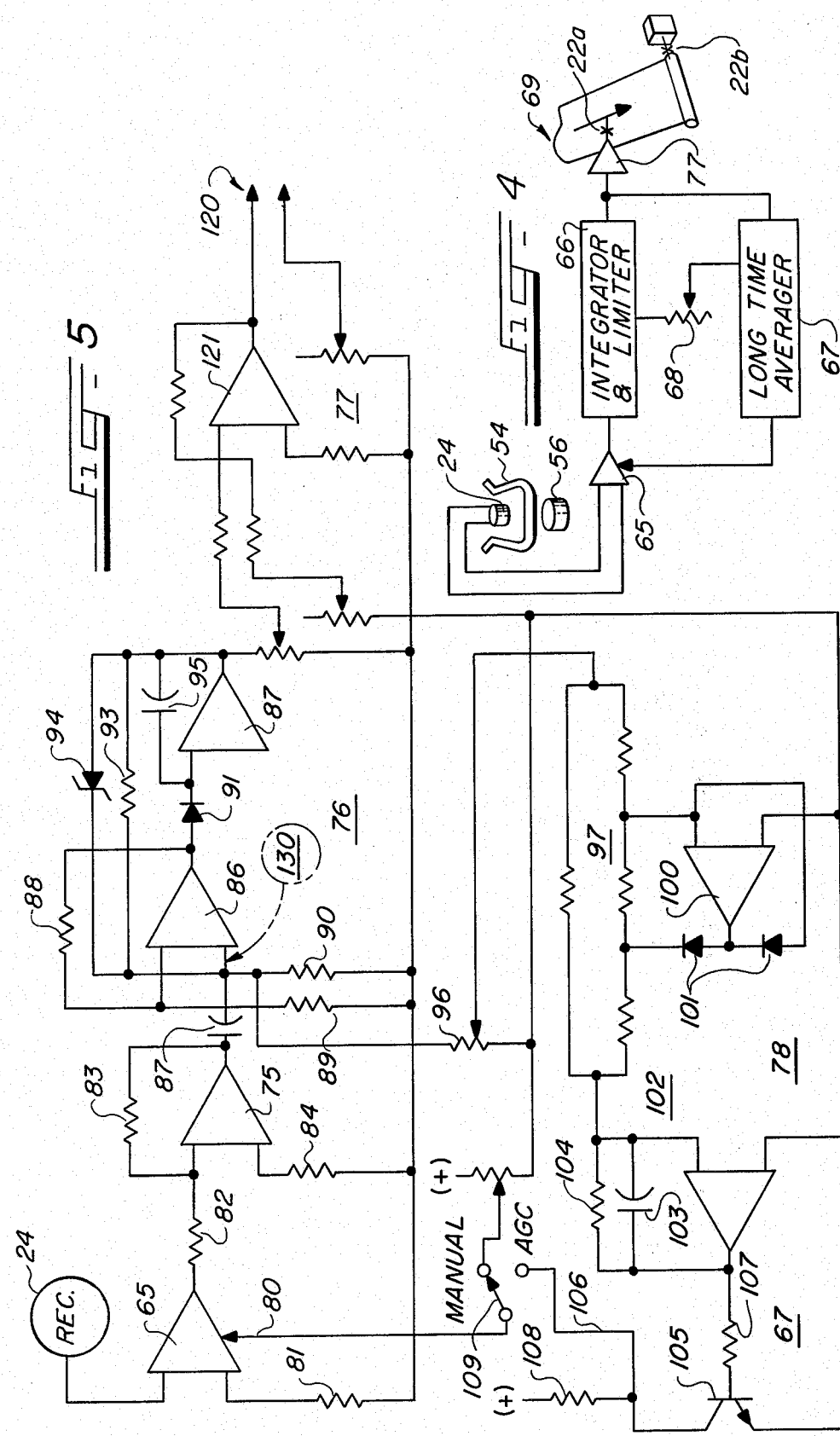

SELF-ADJUSTING ULTRASONIC TIRE INSPECTION DEVICE

This invention relates to ultrasonic tire inspection devices and more particularly to self-adjusting inspection devices which automatically compensate for individual tire characteristics.

In general, ultrasonic tire inspection devices have been known for many years. For an exemplary disclosure, see an article entitled "Ultrasonic Method of Tire Inspection" in the *Review of Scientific Instruments* for December 1952, beginning at page 729. However, this type of device presented many problems. If a thin tread tire and a thick tread tire are successively tested in sequence, it has been necessary to readjust the system. Otherwise the thick tread tire would appear to be defective if tested after a thin tire. Or, a thin tread tire would not disclose any defects if tested after a thick one.

Three ultrasonic inspection techniques have been considered as offering possible bases for equipment design. The first of these is low frequency pulse velocity measurement. In this technique, a pulse of energy is transmitted into the material under test, and the time required for the pulse to propagate through the material to the other side is measured. For a known thickness and transit time, velocity of propagation is determined. This velocity is a function of the dynamic elastic modulus, the density, and Poissons's ratio for the material. For a given structure, it is essentially constant if the fundamental physical properties of the structure remain constant throughout. However, for a given tire, the apparent velocity changes when the pulse of ultrasound is caused to propagate through a region containing an anomaly. This apparent change occurs because the wave must propagate around the anomaly, and therefore has a longer distance to travel. In view of the small size of anomaly to be detected, variations in apparent velocity are uncomfortably close to the magnitude of experimental error.

A second testing procedure uses pulse echo testing. There is an excellent result, and the equipment described herein can be used to measure echoes. However, echo usage does slow the testing procedures. Also, considering the requirements for rapid testing and a simple GO/NO-GO output, the necessary signal processing tends to be unduly complex and, perhaps, too costly for general production inspection use.

As a result, the preferred embodiment transmits sonic energy through the tire itself. This through transmission technique is most likely to satisfy both operational and technical requirements.

However, heretofore, this technique produced large variations in acoustic attenuation between different, good tires of the same type, and between tires of different types and sizes. It has tended to have sensitivity to ambient acoustic noise, interference from sound leakage, standing waves, and reverberation. Basically, the solution to these problems falls into two general areas. The first of these solutions involves adaptive control of system gain, or self-calibration, and second involves control of signal-to-noise ratio.

Accordingly, an object of the invention is to provide new and improved tire inspection devices. In this connection, an object is to provide self-adjusting devices which automatically compensate for the differences between individual tires. In particular, an object is to detect tire defects in a more automatic manner.

In keeping with an aspect of the invention, these and other objects are accomplished by a pair of transducers which are aligned with each other and on opposite sides of the tire. Preferably, one of the transducers and a portion of the tire are submerged in a coupling liquid, such as water. The tire is rotated, and the transducers scan a discrete circumferential segment or track along the tire tread. Then, the transducers reposition themselves to scan the next adjoining segment or track. After each repositioning of the transducers, on the first scan, a long time constant circuit stores a bias signal which represents the average ultrasound transmission during that scan. On the second scan after repositioning, the transducer gives an output signal responsive to instantaneous variations from the bias signal.

An exemplary structure for accomplishing these and other objects is shown in the attached drawings wherein:

FIG. 4 is a block diagram showing the electronic parts of the system used in conjunction with the mechanical parts of FIGS. 1 and 2;

FIG. 5 is a schematic circuit diagram showing the equipment used to complete the structure of FIG. 4;

FIG. 6 is a prospective view of a fragmentary section of a tire casing having an exterior roller type transducer extending across the full width of the tread;

FIG. 7 is a perspective view of a similar tire casing having a rolling wheel type transducer; and FIG. 8 is a perspective view of a similar tire casing using one transducer for both transmitting and receiving.

Figure 1:
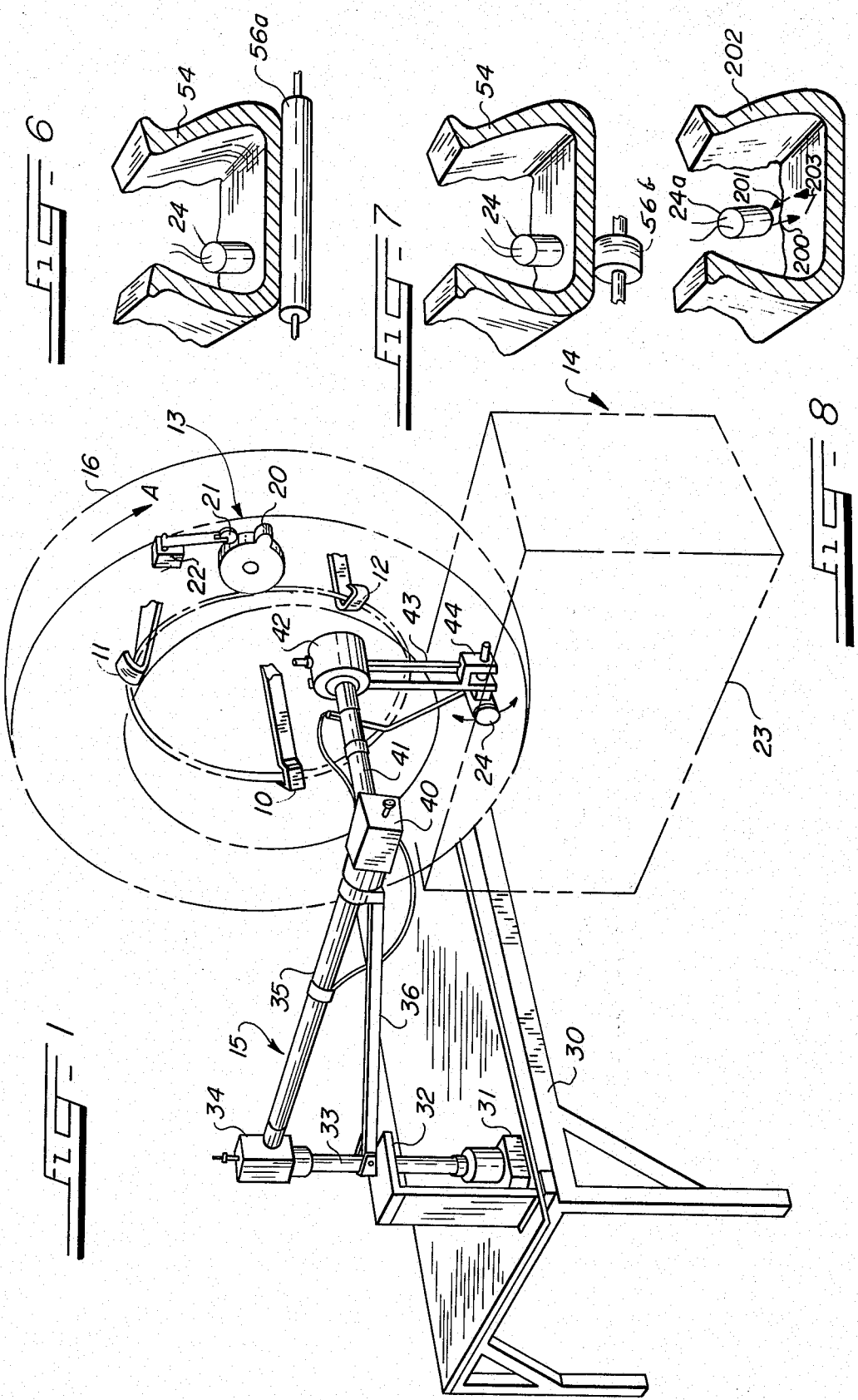
FIG. 1 is a perspective view of the inventive structure.

The major parts of the mechanical system of FIG. 1 are a tire handler, holder and support device 10-12, a rotational position index assembly 13, a liquid coupling assembly tank 14, and an ultrasonic scanner 15.

The tire handler 10-12 includes a plurality of arms, each having end devices which grip the bead on the tire 16 to hold it. The arms are mounted on a suitable journal to rotate the tire 16, as indicated by the arrow A. This handler may be any well-known and suitable device.

The index assembly or means 13 comprises one or more cams 20 which are mounted on and turn with the spreader arms 10-12 and tire 16. A cam follower 21 rides on the cam 20 and operates a switch 22. Thus, the switch 22 opens and closes at the start (or end) of each complete tire revolution.

The liquid coupling apparatus comprises a tank 23 having a fluid surface level which is high enough to submerge the tread of the tire 16. A receiving transducer 24 is suspended inside the tire body. On the other hand, the upper edge of the tank 23 is not so high that it will touch the handler arms 10-12 as the tire rotates.

The achievement of a good signal-to-noise ratio occurs when a maximum practical amount of ultrasonic energy is transmitted into the tire under test, with a minimum of leakage through other paths extending to the receiving transducer. When a water coupling is used between the transmitting transducer and the exterior surface of the tire, the transfer of energy into the tire tends to be maximized. Ultrasonic energy which is not transmitted into the tire is dissipated within the water responsive to reflections from the sides of the tank and from the surface of the water. Because of a mismatch in acoustic impedance between the water, tank walls, and the air, there is virtually no leakage of ultrasound. While the various reflections within the tank may generate standing waves, the effect of these waves can be reduced to negligible proportions by the use of frequency modulation.

The ultrasonic scanner 15 comprises a massive support 30 which rigidly supports the ultrasonic transducer so that it does not shake as the wheel rotates. At 31, 32, journals in the support 15 hold a vertical arm or post 33 leading to a gear box 34. Extending away from the gear box 34 is a horizontal arm 35, braced at 36. Another gear box 40 is connected to a second horizontal arm 41 and, in turn, a third gear box 42. Dependent from gear box 42 is a second vertical post 43 connected to member 44 for supporting the receiving transducer 24.

Figure 2:
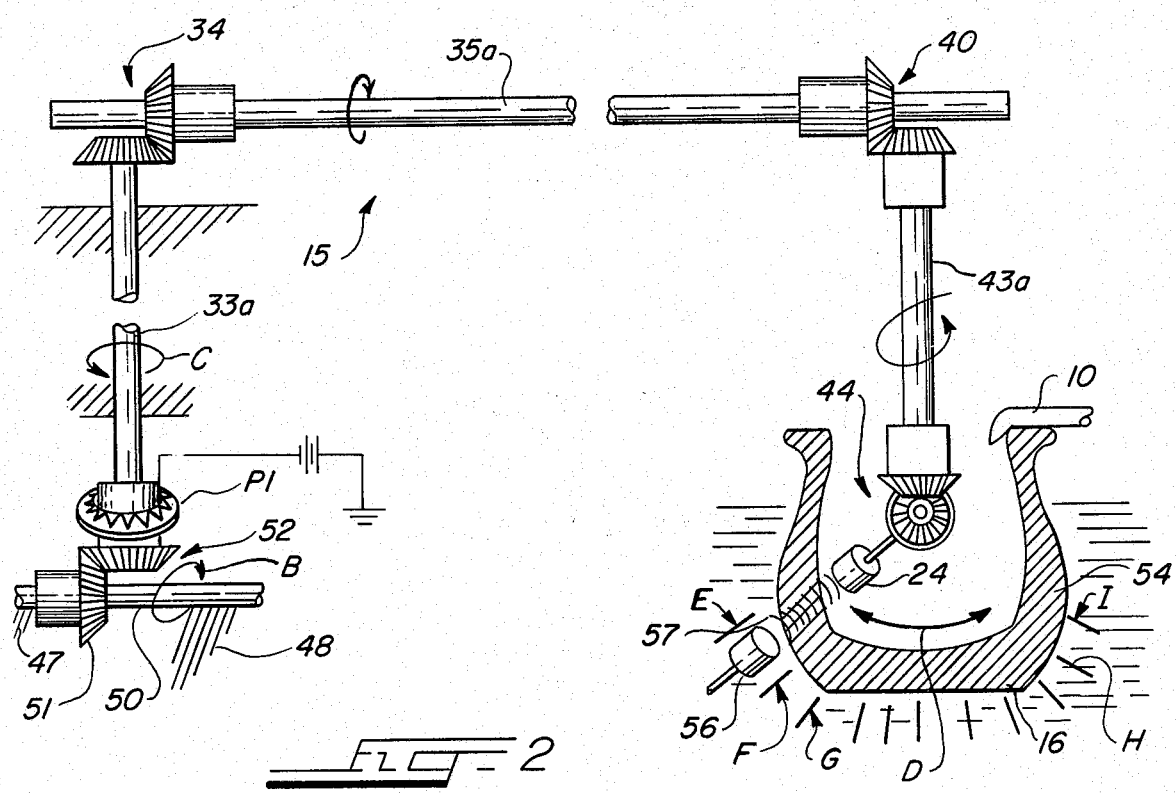
FIG. 2 is a schematic drawing of the power transmission system used to position and reposition the transducers in the system of FIG. 1.

Each of the posts 33, 43 and arms 35, 41 is a hollow pipe having shafts rotatably supported therein for transmitting power to move the receiving transducer 24. The shaft system is shown in FIG. 2. In each case, the reference numeral of the pipe plus the suffix "a" is used to relate the shaft to the pipe in which it is mounted. For example, shaft 33a is mounted concentrically inside the pipe 33. Each of these shafts is rotatably mounted in journal bearings, as indicated by ground symbols, as at 47, 48, for example.

At the near end of the shaft 33a, at the lower lefthand corner of FIG. 2, there is a transmitting potentiometer P1 which provides angular position information for indicating the locations of the transducers 24, 56. The exterior transducer 56 describes a circular arc about the outside of the tire, and the inner transducer follows, so as to remain coaxial with it.

The shafts are interconnected with each other by any suitable means, such as bevel gears. For example, bevel gear 51 is mounted on and turned by the shaft 50. A mating bevel gear 52 is mounted on and turns the shaft 33a. A moment's reflection should make it apparent that if the shaft 50 turns in the direction B, the turning forces are transmitted through the bevel gears 51, 52 to turn the shaft 33a in the direction C.

In a similar manner, each of the other shafts turn in the directions indicated by arrows in FIG. 2. Thus, as the shaft 50 successively rotates over incremental arcs in either of the two opposite directions, the receiving transducer 24 incrementally swings back or forth inside the tire casing 54, as indicated by the double ended arrow D. The receiving transducer is positioned inside the tire to shield it, to some degree, from ambient acoustic noise.

A second or transmitting transducer 56 is mounted outside the casing 54 of tire 16. To further increase the signal-to-noise ratio, a comparatively high-powered, CW transmitter is employed to drive the transmitting transducer 24 with approximately 15–25 watts of acoustic power radiated into the water by the transmitting transducer. The beam width of the transmitting and receiving transducers is about 30°, so that an approximately 1 inch diameter spot on the tire is illuminated. Thus, when the tire is rotated, the transducers scan a striplike path around the periphery of the tire, having a width of about 1 inch. The noise level from all sources in the output of the receiving transducer is several orders of magnitude less than the signal output. The achievement of this signal-to-noise ratio and a large absolute magnitude of output signal allows the use of a straightforward AGC system to provide adaptive gain control.

As the receiving transducer 24 swings back and forth in the directions D, the transmitting transducer 56 is always held in a facing relationship. Therefore, as the receiving transducer 24 generates ultrasonic sound waves 57, the resulting energy travels through a segment of the tire lying between the arrow E and F. As the tire 16 rotates, the transducers scan a circumferential track in this same segment.

After segment E-F is scanned, the transducers 24, 56 move to scan the segment F-G. Likewise, the transducers move step-by-step over each segment until the opposite limit I is reached. Of course the scan may extend over any segment on the surface of the tire. However, as here shown, the transducer 24 swings over an arc of about 120°, more or less.

Lobes on the cam determine both the angular position for starting and ending a series of scans and the angular increment for each scan. In one embodiment shown in FIG. 2, there are ten increments, each of which may be in the order of 12°, so that a total included angle of about 120° is scanned. This is adequate for most tires. However, as the tire diameter becomes greater, the spacing between the tire and the transducers increases proportionately, and a wider strip of the tire is scanned for each angular increment of transducer position. If greater resolution or a different included angle is desired, the cam is exchanged for one providing other desired characteristics.

Figure 3:
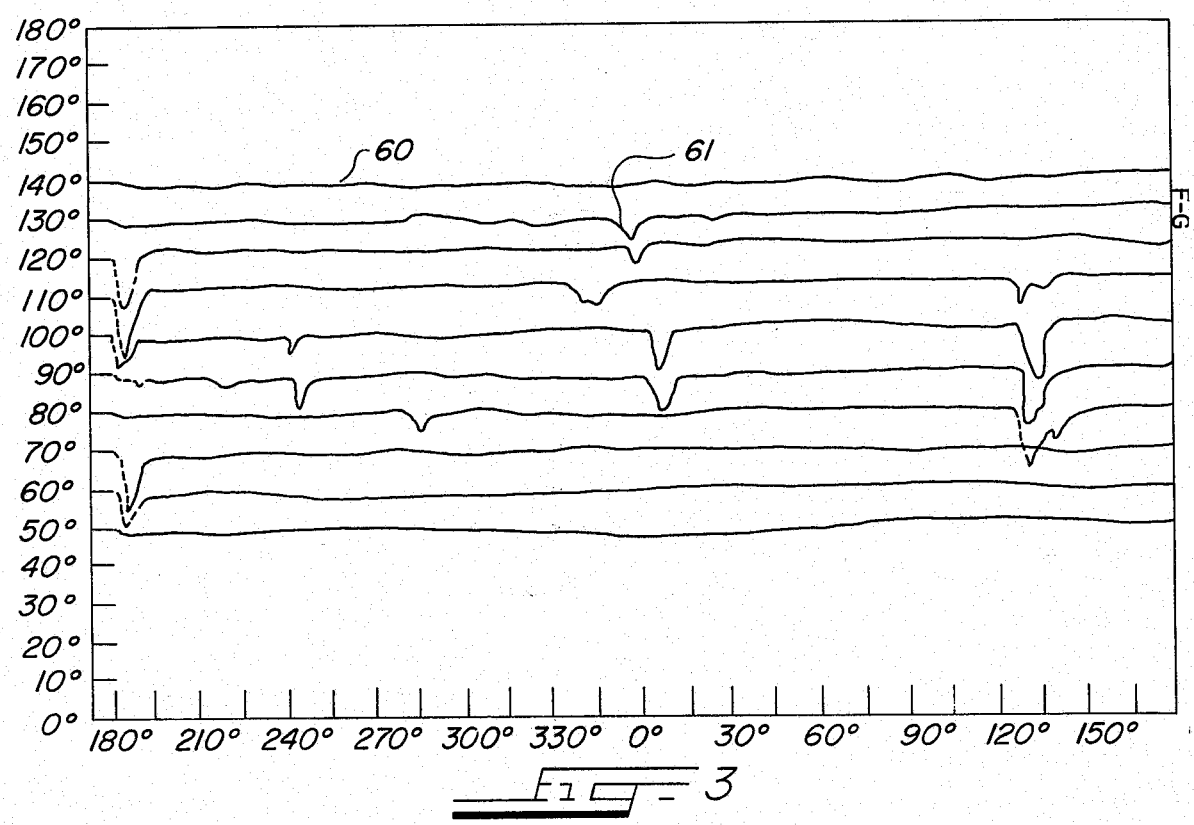
FIG. 3 is a graphical representation of the reading produced by the apparatus of FIG. 1.

On each circumferential scan, a recording (FIG. 3) is made of the ultrasonic energy picked up by the receiving transducer 24. If the tire 16 is completely free of any defect, there will be a uniformity of the attenuation of the ultrasonic signal within the tire casing 54. On the other hand, if there is a defect, it will cause a change in the attenuation of the signal. As a result, the trace on the graph of FIG. 3 will show a substantial deflection responsive to the defect. Thus, for example, the top line in FIG. 3 is the trace of a pen on an X-Y recorder which is made responsive to ultrasonic energy passing through a circumferential segment of the tire casing 54, in the area E-F. The second line in FIG. 3 is a trace made by an X-Y recorder in the circumferential segment F-G. The last trace at the bottom of FIG. 3 is a recording of the last segment H-I.

By an inspection of FIG. 3, it is apparent that some of the tire 16 is free of defects since there is a fairly uniform trace, as at 60. However, at 61, there is a deviation from normal, meaning that the tire 16 contains a defect, characteristic, or other abnormality, which causes an alteration in the attenuation of the ultrasonic energy, to deviate the X-Y recorder signal from normal. Thus, the tire should be inspected in this and other areas, as indicated.

It is easy to find the area for inspection since the radial tire tread 54 segment containing the discontinuity is known from the trace containing the deviation 61. The radial point around the circumference is also known. Each trace begins at the point on the circumference where the cam 20 (FIG. 1) operates the switch 22. The horizontal axis on the graph of FIG. 3 is marked in degrees of circumferential rotation, and the cam 20 or an associated rig or disk is similarly marked. Therefore, if the discontinuity 61 is on the trace of segment F–G and at the angular position of 0°, for example, it is only necessary to turn the tire 16 until the angular position of cam 20 is at 0° and then to examine the tire casing 54 in segment F–G.

The electronic circuit required to make the graph of FIG. 3 is shown in FIGS. 4 and 5. The block diagram (FIG. 4) shows the two transducers 24, 56 on opposite sides of the tire 54, an automatic gain controlled amplifier 65, an integrator and limiter 66, a long time bias setting averager 67, a gain control adjuster 68, and an X-Y plotter 69.

In keeping with the invention, each time that the transducers reposition themselves, there are at least two complete circumferential scans of the discrete segment as the tire rotates between the transducers 24, 56. On the first scan, the ultrasonic energy picked up by the receiving transducer 24 is fed into a long time averager circuit 67. There, an average voltage is stored which represents the average reading derived during the scan. This voltage is fed into the amplifier 65 to adjust its gain to reflect the average.

During the next circumferential scan, the amplifier 65 gives an output signal at the gain level fixed by the bias signal from the circuit 67. Thus, the output on the second scan is always taken with respect to the same level without regard to any variations in the thickness of the tire tread under test. When the switch 22 is operated by cam 20 at the start of each scan, contacts 22a, 22b (FIG. 4) close to make a trace on the chart of FIG. 3.

The circuit for completing the block diagram of FIG. 4 is shown in FIG. 5. Here the major elements and subcircuits are, the receiving transducer 24, the automatic gain controlled amplifier 65, a fixed amplifier 75, a d.c. rectifier, integrator, and limiter 76, an adder 77, and a long time averaging circuit 78.

The receiving transducer 24 is connected to the upper input of the amplifier 65. The input signal level at that point is, typically, about 10 to 15 millivolts peak-to-peak. The amplifier 65 is a gain control amplifier, having a maximum gain of about 10 and a gain range of about 90 dB. In other words, it goes from about plus 20 to minus 70 dB. The output of amplifier 65 has a controlled voltage level which is fixed by an automatic gain control signal produced by circuit 78 and applied to the terminal 80. Usually, the gain is somewhere in the neighborhood of unit. The resistor 81 supplies a symmetrical input impedance, and the resistor 82 provides coupling and feedback in conjunction with resistor 83.

The output of the amplifier 65 is applied through resistor 82 and into the negative input terminal of the fixed gain amplifier 75. Amplifier 75 has a gain of approximately 100 which is established by the ratio of the resistors 82, 83. The resistor 84 provides a symmetrical input impedance for the amplifier 75.

The output of the fixed gain amplifier 75 is applied to the input of the amplifiers 86, 87 via a coupling capacitance 87. The feedback resistor 88 sets the gain of the amplifier 86, and the resistors 89, 90 provide symmetrical input impedances. A diode 91 provides a d.c. response by rectifying the positive going signals which are then fed into an inverting input of amplifier 87. A phase inversion occurs in the amplifier 87 which has an output of a negative going polarity.

Negative feedback is provided by the negative going signal feeding back from the output of amplifier 87 through a feedback loop comprised of a resistor 93 and a zener diode 94. The feedback extends to the non-inverting input of amplifier 87. That polarity is such that it opposes the positive voltage passing through the diode 91. Thus, there is an inverse feedback loop for maintaining stability.

The zener diode 94 breaks down at about 5 to 6 volts, to clamp the output of the amplifier 87 at the zener voltage level. Hence, the output of circuit 76 is bound at the zener voltage level. By virtue of this action, the output of amplifier 87 cannot exceed the zener diode breakdown voltage. The amplifiers 86, 87 have a gain which cooperates with the zener diode 94 breakdown voltage and the rectified positive going voltage passed by the diode 91 to suppress the contact potentials. Therefore, in effect, the circuit 76 behaves as an ideal rectifier, and the zener diode 94 has an ideal knee. The capacitor 95 has a smoothing filter effect.

The point in having the zener diode bound limit at the output of circuit 76 is to establish a reference level. An a.c. input signal higher than that required for the zener breakdown voltage is received from a "good" tire section. At the same time, nothing is overloaded. Accordingly, the input signal rises, within reasonable limits, as high as necessary, and yet, immediately upon the removing or reducing of the input signal, the output will track the transducer 24 output, as it goes below the zener breakdown voltage. The drop of the signal below the bound voltage is a defect signal. This action gives a very fast response with great fidelity. Or stated another way, as long as the tire is good, there is no change in the output at the bound level.

The input of an automatic gain control circuit 78 is connected to potentiometer 96 at a point lying between the output of amplifier 75 and the input of the amplifier 86. Hence, the input to the automatic gain control circuit 78 is the same signal which will ultimately drive the X-Y plotting recorder 69.

The AGC input signal is applied through the voltage level adjusting potentiometer 96 to a precision rectifier circuit 97. This potentiometer 96 adjusts the level of the a.c. signal, before it is rectified at 100, 101. More particularly, after the potentiometer 96 adjusts the level of the a.c. signal feeding into the amplifier 100, it is rectified at a precision rectifier 101. The gain of the operational amplifier 100 serves to suppress the contact potentials or forward voltage drops across the diodes 101. Therefore, the circuit 100 provides a very reliable response to very small signals. It generates a rectified a.c. or d.c. output signal which is proportional to the input signal. The circuit constants are preferably such that the amplifier 100 has a gain of about 10.

The output of the precision rectifier 97–101 is fed into the input of amplifier 67 which has a very long time constant, in the order of ten seconds, or longer, for a full scale swing. This timing is set by a resistor capacitor network 102 connected between the output and input of the amplifier 67. The capacitor 103 is about 94 microfarads, and the resistor 104 is about 120K resistor.

Amplifier 67 operates as an averaging circuit which maintains a long-term voltage which varies as the average of the a.c. input signal as converted to d.c. Thus, the output of amplifier 67 is a smooth d.c. bias potential, the voltage of which is an indication of the long-term average of the signal picked up by the receiving transducer 24. This bias potential is applied to the base of a driver transistor 105 and, therefore, in turn to the AGC control line 106 leading to the control terminal 80 on the amplifier 65. Resistor 107 is a coupling device, and resistor 108 is a collector load for transister 105. The bias potential is thus applied to the gain control terminal 80 input on amplifier 65. Accordingly, in the AGC position of switch 109, the amplifier 65 always gives the same relative average output signal regardless of how thick or thin the tire tread is.

Control switch 109 is provided for selecting between manual and fully automatic operation. In the manual mode the speed of tire rotation can be adjusted from 0 to about 20–25 rpm. The transducer positioning is continuously adjustable over an arc of about 170°, more or less. In the automatic mode, the transducers move out to the start position, and tire rotation starts at 20 rpm, for example. On every second rotation, the transducers change their angular position by 12° (or another increment determined by the programming cam). At the end of the last incremental scan, tire rotation stops, and the transducers return to the start position, thus completing the automatic cycle.

In operation, the tire 16 rotates at about 20 to 25 rpm, and the receiving transducer 24 picks up ultrasonic energy transmitted through and attenuated by the tire casing 54. As the tire 16 rotates through an entire 360°, it makes a recording of the tire quality. The recording starts at zero circumferential degrees, in the center of the chart (FIG. 3). As the tire rotates, it causes the X-Y recorder to plot good or defective signals according to the level of the sonic energy received over the entire 360°. During this time the transmitting and receiving transducers 56, 24, move over an internal scan of the tire tread for about 90°, depending on the tire.

As the tire 16 is rotating, there is a considerable amount of variation in the ultrasonic signal level appearing at the input of the system. On the first scan in each tire segment, a long term d.c. level is established at the control input 80 of amplifier 67, because of the d.c. level on the AGC bus leading to the constant level control input terminal 80 of amplifier 65. This d.c. level maintains average a.c. output from amplifier 65 during the entire second scan of the same tire segment.

There are instantaneous variations in the output of receiving transducer 24, but the average level is constant. The instantaneous level variations reflect the variations in the ultrasonic attenuation and transmission through the tire. If necessary, the level of the sonic energy going into the AGC system is adjusted at the input potentiometer 96. If the resistance of potentiometer 96 is increased, the signal level out of transistor 105 is reduced and there is a smaller a.c. signal at the output of amplifier 75. Therefore, it is possible to establish an average a.c. level at the input to amplifier 86. All signals which are greater than the bound level set by the breakdown voltage of the zener diode 94 stay flat at the output. However, if there is an instantaneous decrease in the signal level, the amplifier 86 moves out of the bound range, and its output drops. Therefore, in effect, the bound level forms a threshold level for giving a snap action output responsive to the detection of a defect.

Tires with steel belts do not cause any significant difference, as compared with fabric belts. The steel causes the general signal level to shift slightly, but this is little more than the shift caused by the differences between thick or thin tires. Thus, the steel belts fall within the dynamic range of the system.

It is necessary to drive a strip chart recorder to have a record of information as to the angular position of the tire in both its rotation and in the segment being scanned. Therefore, the X and y information is generated by two servo mechanisms (one which includes potentiometer P1, FIG. 2) coupled onto the shafts of the recording equipment. The X-axis information is taken from the shaft mechanism 13 that rotates with the tire. A d.c. ramp voltage is generated by a linear potentiometer that feeds directly into the X-axis input 120 of an X-Y plotter. Thus, a linear X-axis deflection is produced to cause the plotter to record a signal versus tire rotations.

On the Y-axis, a d.c. voltage is generated as the transducers rotate across the tire casing in a plane which is perpendicular to the major plane of the tire. This Y-axis voltage is summed with the output signal which contains transmission information that is offset on each successive scan, to provide a series of graphs across the paper, as shown in FIG. 3. The Y-axis signal is amplified and formed at 77, in a unity gain summing amplifier 121 with two inputs.

The X-Y recorder 69 indicates the angular position of the transducers on the Y-axis, and angular position of the tire on the X-axis, as well as the level of the sonic energy transmission through the tire. Y-axis, or $\phi$ coordinate information is derived from the transmitting potentiometer P1 on the interior transducer drive shaft. X-axis, or $\theta$ coordinate information is derived from a similar potentiometer (not shown) mounted on the main shaft of the spreader (near cam 103). A control is also provided, which is active in both manual and automatic modes, to cause the transducers to return automatically to the vertical position for tire loading. The transducers re-position themselves after every second rotation of the tire. During the alternate rotation, the X-Y plotter is enabled, and a plot of transmission through the tire is made. This way enough time is allowed for the plotter to re-trace and for the transducer positioning, without missing any of the tire surface.

In a further embodiment of the invention, an optional a.c. converter 130 is inserted into the signal at the input of the amplifier 86. This a.c. signal digitizes the ultrasonic signal and resolves the signal into one-half inch increments on the tire. The digital signal represents the instantaneous amplitude of the signal. If a shaft encoder is used at 130 to digitize, the amplitude of the sonic energy transmitted through the tire also includes a code indicating the angular position of the transducers, both inside the tire and outside the tire as it is scanned. Thus, the address of the particular spot at which the sonic energy is being digitized appears in the signal.

According to further embodiments of the invention, more transducers are used for scanning more sections of the tire simultaneously. In that case, the circuit of FIG. 5 is duplicated for each transducer. Therefore, the tire may be scanned in less time.

As mentioned above water coupling is used since it is a solution to the signal-to-noise ratio and sound leakage problems. However, it is also desirable to have a practical means of coupling ultrasonic energy into a tire without the use of water, but with equivalent effectiveness. Accordingly alternative embodiments of a wheel or roller type transducer ride on the exterior surface of the tire tread to produce excellent results. In FIG. 6, the water coupling and tank 14 are eliminated. Instead a rubber or other elastomer covered roller 56a rides on the full width of the tread of the tire as it turns. In FIG. 7, the roller is reduced in width to the dimensions of a small rubber tired wheel 56b. In each case, the elastomer covering of the roller 56a or tire 56b closely couples the sonic emergy transmission line to the tire tread. It has the effect of making the tread appear slightly thicker. However, this added thickness is within the testing system's normal reading range and has no more effect than a tire with an extra thick tread. The embodiment of FIG. 7 repositions the transducer wheel 56b as described above in connection with the positioning of the transducer 56. The roller 56a eliminates this need for repositioning. Of course the invention is also broad enough to cover any width roller or wheel type transducer.

When an echo technique is used (FIG. 8), the transducer 24a transmits a burst of sonic energy 200 and then receives an echo 201 of that burst as reflected from the tire casing 202, at 203. Any defect in the tire 202 causes a variance in the length of time required for the sound 201 to be reflected back to the transducer 24a.

Still other modifications will readily occur to those who are skilled in the art. Therefore, the appended claims are to be construed to include all equivalents falling within the true scope and spirit of the invention.

I claim:

1. An ultrasonic tire inspection device comprising means for rotating a tire, an ultrasonic transmitting transducer, an ultrasonic receiving transducer, means for supporting said ultrasonic transmitting transducer on one side of the tire casing and said ultrasonic receiving transducer on the opposite side of the tire casing, means for rotating said tire through at least two complete 360° revolutions, means responsive to the output of said receiving transducer during a first 360° revolution for setting an average bias level, and means responsive to the output of the receiving transducer on another of said 360° revolutions for recording significant variations from said average bias level.

2. The device of claim 1 wherein said transducers are repeatedly repositioned to scan the cross section of said tire casing, there being at least two 360° revolutions after each repositioning of the transducers.

3. The device of claim 2 and a timing circuit having a long time constant, said means for setting said average bias level comprising an amplifier controlled by said timing circuit having a long time constant.

4. The device of claim 3 and means for submerging said tire and at least one of said two transducers under a coupling liquid.

5. The device of claim 3 wherein at least one of said transducers comprises a rotating means mounted to roll along a surface of said tire.

6. The device of claim 5 wherein said rotating means comprises an elastomer surface in rolling contact with said tire.

7. The device of claim 3 and a feedback means having a breakdown characteristic with a sharp knee at the point of breakdown, and means responsive to said average bias level for setting said knee at a point representing a good tire casing.

8. The device of claim 7 and means responsive to changes in the output of said receiving transducer in the presence of a tire defect for deriving an output signal below said knee of said breakdown characteristic, whereby the output has a snap action in the presence of said defect.

9. The device of claim 7 and means for digitizing the output of said receiving transducer.

10. The device of claim 9 and means for encoding the output of said receiving transducer as a function of the rotary position of said tire.

11. An ultrasonic tire inspection device comprising means for initially scanning the casing of a tire with ultrasonic energy, means responsive to the receipt of said ultrasonic energy during said initial scan for providing a bias level signal which is proportional to the average level of ultrasonic energy received during said initial scan, means for thereafter scanning said casing of said tire a second time with said ultrasonic energy, and means responsive to the receipt of additional ultrasonic energy during said second scan for recording certain deviations in levels of ultrasonic energy received as compared to said average bias level signal.

12. The device of claim 11 and means for providing a snap action recording responsive to said deviations.

13. The device of claim 11 wherein said sonic energy is transmitted through said tire casing.

14. The device of claim 11 wherein the sonic energy is an echo reflected from said tire casing.

* * * * *